United States Patent [19]

Nakaura

[11] Patent Number: 5,594,648
[45] Date of Patent: Jan. 14, 1997

[54] ANTISKID CONTROL APPARATUS

[75] Inventor: Tohru Nakaura, Itami, Japan

[73] Assignee: Sumitomo Electric Industries, Ltd., Osaka, Japan

[21] Appl. No.: 362,885

[22] Filed: Dec. 23, 1994

[30] Foreign Application Priority Data

Dec. 29, 1993 [JP] Japan .................... 5-351026

[51] Int. Cl.$^6$ .................................. B60K 17/34
[52] U.S. Cl. .................. 364/426.01; 364/426.01; 180/244
[58] Field of Search ............. 364/426.02, 426.03, 364/426.01; 303/115, 167, 171, 190; 180/197, 247, 248, 233, 244

[56] References Cited

U.S. PATENT DOCUMENTS

| | | | |
|---|---|---|---|
| 4,762,376 | 8/1988 | Matsubara | 303/115 |
| 4,770,266 | 9/1988 | Yamaguchi et al. | 180/197 |
| 4,792,193 | 12/1988 | Takahashi et al. | 303/100 |
| 4,866,625 | 9/1989 | Kawamoto et al. | 364/426.02 |
| 4,943,922 | 7/1990 | Tanaka | 364/426.02 |
| 5,005,663 | 4/1991 | Nilde et al. | 180/247 |
| 5,014,809 | 5/1991 | Matsuda | 180/248 |
| 5,019,985 | 5/1991 | Yasuno et al. | 364/426.02 |
| 5,032,995 | 7/1991 | Matsuda et al. | 364/426.03 |
| 5,249,849 | 10/1993 | Sakata | 303/100 |
| 5,251,719 | 10/1993 | Eto et al. | 180/197 |
| 5,275,254 | 1/1994 | Shiraishi et al. | 180/248 |
| 5,289,895 | 3/1994 | Takata et al. | 180/248 |
| 5,366,041 | 11/1994 | Shiraishi et al. | 180/248 |

FOREIGN PATENT DOCUMENTS

| | | |
|---|---|---|
| 0318928 | 6/1989 | European Pat. Off. . |
| 3733661 | 4/1988 | Germany . |
| 1311939 | 12/1989 | Japan . |

OTHER PUBLICATIONS

An English language abstract of JP 1-311939.

*Primary Examiner*—Kevin J. Teska
*Assistant Examiner*—Russell W. Frejd
*Attorney, Agent, or Firm*—Greenblum & Bernstein P.L.C.

[57] ABSTRACT

An antiskid control apparatus for vehicles having a part-time four-wheel drive mode. The antiskid control apparatus calculates an average front wheel speed and an average rear wheel speed. A difference between the average front wheel speed and average rear wheel speed is determined, and is filtered to obtain a smoothed wheel speed difference value. Based on the value of the smoothed wheel speed difference value, a determination is made whether the vehicle drive state is the two-wheel drive state or four-wheel drive state. The antiskid control of the vehicle is switched between two-wheel control and four-wheel control in accordance with the determined vehicle drive state.

9 Claims, 9 Drawing Sheets

ANTISKID CONTROL APPARATUS

BACKGROUND OF THE INVENTION

1. Field of the Invention

The present invention relates to an antiskid control apparatus and more particularly to an antiskid control apparatus to be applied to a part-time four wheels drive (4WD) in which a two wheels drive (2WD) can be switched to a four wheels drive (4WD) and vice versa.

2. Description of the Related Art

In applying the antiskid control apparatus to a vehicle adopting the 4WD, the wheel speeds of the vehicle are synchronized with each other especially on a road having a low friction coefficient because the axle of the front wheels and that of the rear wheels are connected with each other. Thus, in the general control of a 2WD vehicle, for example, in controlling the front wheels independently and controlling the rear wheels by select low control, each wheel slips greatly, thus lowering the stability of the vehicle and generating uncomfortable vibrations on the vehicle.

various antiskid control apparatuses for use in the 4WD vehicle have been proposed.

According to an antiskid control apparatus disclosed in Japanese Laid-Open Patent Publication No. 1-311939, when the difference between the average wheel speed of front wheels and the average wheel speed of rear wheels is large, the general control of the 2WD vehicle is performed, whereas when the difference between the average wheel speed of the front wheels and the average wheel speed of the rear wheels is small, i.e., when the wheel speeds of the vehicle are synchronized with each other, wheels belonging to the same hydraulic system are controlled by selecting the low control. In this manner, the wheels are prevented from interfering with each other.

As a method for driving a vehicle, part-time 4WD is known. In the part-time 4WD, the 2WD State in which the axle of the front wheels or that of the rear wheels is driven can be switched to the 4WD state in which the both axles are connected with each other and vice Versa. A disadvantage occurs when the conventional antiskid control apparatus for the 4WD is applied to the part-time 4WD.

That is, even when the 2WD state is selected in the part-time 4WD, there is a case in which the difference between the average wheel speed of the front wheels and the average wheel speed of the rear wheels becomes temporarily small. In this case, if wheels belonging to the same hydraulic system are controlled by select low control as in the case of the conventional antiskid control apparatus for use in the 4WD, the braking force is lowered and thus the stopping distance becomes long.

In the part-time 4WD, although the speed of the front wheel and that of the rear wheel are synchronized with each other in the 4WD state, phase difference occurs due to the torsional rigidity of the driving shaft (propeller shaft). As a result, the difference between the average wheel speed of the front wheels and the average wheel speed of the rear wheels fluctuates and may become temporarily large. In this case, in the conventional antiskid control apparatus for use in the 4WD, there is a case in which the control of the 2WD is performed although the vehicle is in the 4WD state. As a result, the wheels cannot be prevented from interfering with each other.

It is conceivable to provide a sensor for detecting the switching between the 2WD state and the 4WD state to change over the control of the braking system by inputting a signal outputted from the sensor to the antiskid control apparatus. The provision of the change-over sensor causes the manufacturing cost to be high and the antiskid control apparatus to be unreliable.

SUMMARY OF THE INVENTION

The present invention has been developed with a view to substantially solving the above described disadvantages and has for its essential object to provide an improved antiskid control apparatus which correctly discriminate a 2WD state and a 4WD state of a part-time 4WD and accomplishes an antiskid control according to a drive state.

In order to achieve the aforementioned object, according to one aspect of the present invention, there is provided an antiskid control apparatus for a vehicle capable of switching a drive state thereof between a 2WD and a 4WD comprising: means for calculating an average front wheel speed and outputting a signal indicating the calculated average front wheel speed; means for calculating an average rear wheel speed and outputting a signal indicating the calculated average rear wheel speed; speed difference calculation means for calculating a speed difference between the average front wheel speed and the average rear wheel speed and outputting a signal indicating the calculated speed difference; means for smoothing the speed difference and outputting a signal indicating the calculated smoothed speed difference; and drive state decision means for deciding the drive state of the vehicle as a 4WD state if the smoothed speed difference is in a range between a predetermined upper threshold and a predetermined lower threshold and as a 2WD state if the smoothed speed difference is in a range above the predetermined upper threshold or below the predetermined lower threshold. In this construction, according to the drive state obtained by the drive state decision means the antiskid control state of the vehicle is switched between an antiskid control for the 2WD and an antiskid control for the 4WD.

According to another aspect of the present invention, there is provided an antiskid control apparatus for a vehicle capable of switching a drive state thereof between a 2WD and a 4WD comprising: means for calculating an average front wheel speed and outputting a signal indicating the calculated average front wheel speed; means for calculating an average rear wheel speed and outputting a signal indicating the calculated average rear wheel speed; speed difference calculation means for calculating a speed difference between the average front wheel speed and the average rear wheel speed and outputting a signal indicating the calculated the speed difference; first addition means for performing an addition of a calculation value when the speed difference between the average front wheel speed and the average rear wheel speed is positive and performing a subtraction of the calculation value when the speed difference is negative; and drive state decision means for deciding the drive state of the vehicle as a 4WD state if the calculation value is in a range between a predetermined upper threshold and a predetermined lower threshold and as a 2WD state if the calculation value is in a range above the predetermined upper threshold or below the predetermined lower threshold. In this construction, according to the drive state obtained by the drive state decision means, the antiskid control state of the vehicle is switched between an antiskid control for the 2WD state and an antiskid control for the 4WD state.

According to still another aspect of the present invention, there is provided an antiskid control apparatus for a vehicle capable of switching a drive state thereof between a 2WD and a 4WD comprising: means for calculating an average front wheel speed and outputting a signal indicating the calculated average front wheel speed means for calculating an average rear wheel speed and outputting a signal indicating the calculated average rear wheel speed; speed difference calculation means for calculating a speed difference between the average front wheel speed and the average rear wheel speed and outputting a signal indicating the calculated the speed difference; first addition means for performing an addition of a calculation value when the speed difference between the average front wheel speed and the average rear wheel speed is positive and performing a subtraction of the calculation value when the speed difference is negative; second addition means for checking the calculation value for each predetermined number of control cycles, thus performing a subtraction when the calculation value is positive and performing an addition when the calculation value is negative; and drive state decision means for deciding the drive State of the vehicle as a 4WD state if the calculation value is in a range between a predetermined upper threshold and A predetermined lower threshold and as a 2WD state if the value the calculation value is in a range above the predetermined upper threshold or below the predetermined lower threshold. In this construction, the antiskid control state of the vehicle is switched between an antiskid control for the 2WD state and an antiskid control for the 4WD state according to the drive state obtained by the drive state decision means.

In the above constructions, the first addition means performs an addition of the value the calculation value when the speed difference between the average front wheel speed and the average rear wheel speed is more than an upper limit value of a dead zone having a predetermined width including zero and performs a subtraction the calculation value when the speed difference is less than a lower limit value of the dead zone.

In the above construction, when the drive state decision means detects the drive state of the vehicle as the 2WD state, the antiskid control for the 2WD is performed until an entire antiskid control is completed.

In the above constructions, the drive state decision means sets the absolute value of the Upper threshold and that of the lower threshold to a great value, respectively within a predetermined period of time after the start of a braking operation of the vehicle so that it is difficult to decide the drive state as the 2WD state.

In the above constructions, when the vehicle adopts the rear wheel drive during the 2WD state, the drive state decision means sets the absolute value of the upper threshold to be greater than that of the lower threshold.

In the above constructions, when the vehicle adopts the front wheel drive during the 2WD, the drive state decision means sets the absolute value of the lower threshold to be greater than that of the upper threshold.

The antiskid control apparatus further comprises a sensor for detecting an acceleration of the vehicle in a lengthwise direction thereof so that the 2WD state and the 4WD state are discriminated from each other only when the deceleration of the vehicle is less than a predetermined value during the antiskid control and the antiskid control for the 2WD is performed when the drive state is not discriminated.

According to the antiskid control apparatus, the drive state decision means decides the drive state of the vehicle as the 4WD state if the smoothed speed difference is in the range between the predetermined upper threshold and the predetermined lower threshold and as the 2WD state if the smoothed speed difference is in the range above the predetermined upper threshold or below the predetermined lower threshold. The antiskid control state of the vehicle is switched between the antiskid control for the 2WD and the antiskid control for the 4WD according to the drive state. Therefore, an appropriate -antiskid Control can be accomplished, depending on the drive state of the vehicle.

The first addition means performs an addition of the calculation value when the speed difference between the average front wheel speed and the average rear wheel speed is positive and performs a subtraction of the calculation value when the speed difference is negative. The drive state decision means decides the drive state of the vehicle as the 4WD state if the calculation value is in the range between the predetermined upper threshold and the predetermined lower threshold and as the 2WD state if the calculation value is in the range above the predetermined upper threshold or below the predetermined lower threshold. Therefore, an appropriate antiskid control can be accomplished,/depending on the drive state of the vehicle.

In this construction, the second addition means checks the calculation value for each predetermined number of control cycles, thus performing a subtraction when the calculation value is positive and performing an addition when the calculation value is negative. Accordingly, even though the behaviors of wheels become unstable temporarily, the second addition means prevents unnecessary additions or subtractions of the calculation value from being performed, and hence an appropriate antiskid control can be accomplished, depending on the drive state of the vehicle.

In this construction, the first addition means performs an addition of the calculation value when the speed difference between the average front wheel speed and the average rear wheel speed is more than the upper limit value of the dead zone having the predetermined width including zero and performs a subtraction of the calculation value when the speed difference is less than the lower limit value of the dead zone. In this manner, slight oscillation of the wheel speed is eliminated and the drive state of the vehicle can be correctly detected.

When the drive state decision means detects the drive state of the vehicle as the 2WD state, the antiskid control for the 2WD is performed until an entire antiskid control is completed. This construction prevents the antiskid control for the 2WD from being switched to the antiskid control for the 4WD. Thus, the behavior of the vehicle is stable during the antiskid control.

The absolute value of the upper threshold and that of the lower threshold are set to a great value, respectively within a predetermined period of time after the start of a braking operation of the vehicle. Thus, the drive state can be correctly detected without being affected by vibrations of the wheels at the start of braking operation.

In the case of a vehicle adopting the rear wheel drive during the 2WD state, the speed difference between the average front wheel speed and the average rear wheel speed is located on the upper threshold side. Thus, the 4WD state can be prevented from being erroneously decided as the 2WD state by setting the absolute value of the upper threshold to be greater than that of the lower threshold.

In the case of a vehicle adopting the front wheel drive during the 2WD state, the speed difference between the average front wheel speed and the average rear wheel speed is located on the lower threshold side. Thus, the 4WD state can be prevented from being erroneously decided as the 2WD state by setting the absolute value of the lower threshold to be greater than that of the upper threshold.

In the antiskid control apparatus, a sensor for detecting the acceleration of the vehicle in a lengthwise direction thereof is provided so that the 2WD state and the 4WD state are discriminated from each other only when the deceleration of the vehicle is less than a predetermined value during the antiskid control, and the antiskid control for the 2WD is performed when the drive state is not discriminated. In this construction, the 2WD state and the 4WD state are discriminated from each other only on a road, having a low friction coefficient, on which the change-over between the antiskid for the 2WD and that of the 4WD is necessary, and further, on a road having a high fraction coefficient, the braking force can be prevented from being lowered because the antiskid control for the 4WD is not performed during the 2WD state.

BRIEF DESCRIPTION OF THE DRAWINGS

These and other objects and features of the present invention will become clear from the following description taken in conjunction with the preferred embodiments thereof with reference to the accompanying drawings throughout which like parts are designated by like reference numerals, and in which.

DETAILED DESCRIPTION OF THE PREFERRED EMBODIMENTS

Figure 1:
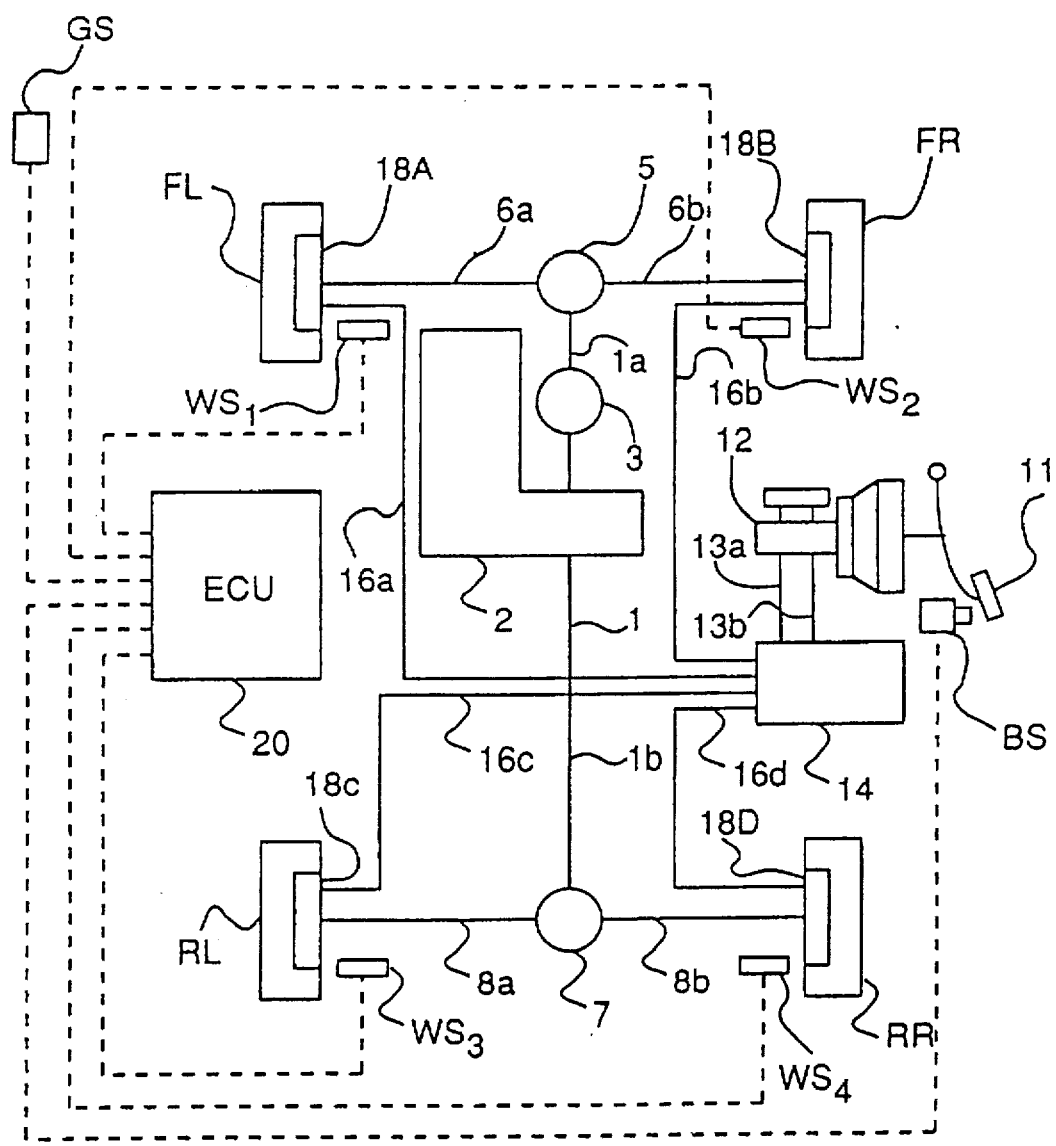
FIG. 1 is a schematic view showing an antiskid control apparatus according to a first embodiment of the present invention.

Before the description of the present invention proceeds, it is to be noted that like parts are designated by like reference numerals throughout the accompanying drawings.

An antiskid control apparatus according to a first embodiment of the present invention is described below with reference to FIGS. 1 and 2. The antiskid control apparatus is applied to a vehicle of part-time 4WD type in which the front wheels thereof are driven during 2WD state.

The driving force of an engine 2 is transmitted to wheels by a driving shaft 1. There is provided, on the driving shaft, a central control mechanism 3 which is operative and unoperative by the operation of a driver.

A front wheel side differential mechanism 5 connected with a front wheel side driving shaft $1a$ is coupled with a pair of wheel shafts $6a$ and $6b$ connected with a left front wheel FL and a right front wheel FR, respectively. A rear wheel side differential mechanism 7 connected with a rear wheel side driving shaft $1b$ is coupled with a pair of rotary shafts $8a$ and $8b$ connected with a left rear wheel RL and a right rear wheel RR, respectively.

In the part-time 4WD vehicle, the central control mechanism is operative and unoperative by the operating pressing of a change-over switch (not shown) to switch the drive state between the 2WD (front wheel drive) state and the 4WD state.

A master cylinder 12 to be operated by a brake pedal 11 is connected with master cylinder side duct lines $13a$ and $13b$. The master cylinder side ducts $13a$ and $13b$ are connected with corresponding wheel brake side duct lines $16a$, $16b$, $16c$, and $16d$ via a hydraulic pressure adjusting means 14.

Via the hydraulic pressure adjusting means 14, the master cylinder side duct line $13a$ is connected with the wheel brake side duct line $16a$ connected with a wheel brake 18A of the left front wheel FL and the wheel brake side duct $16d$ connected with a wheel brake 18D of the right rear wheel RR. Via the hydraulic pressure adjusting means 14, the master cylinder side duct line $13b$ is connected with the wheel brake side duct line $16b$ connected with a wheel brake 18B of the right front wheel FR and the wheel brake side duct line $16c$ connected with a wheel brake 18C of the left rear wheel RL.

The hydraulic pressure adjusting means 14 has a known construction. That is, the hydraulic pressure adjusting means 14 comprises actuators $ACT_1$, $ACT_2$, $ACT_3$, and $ACT_4$ (shown in FIG. 2) actuated by drive signals transmitted from an electronic control unit 20, thus adjusting the hydraulic pressure of the wheel brakes 18A and 18B of each of the left front wheel FL and the right front wheel FR and that of the wheel brakes 18C and 18D of each of the left rear wheel RL and the right rear wheel RR.

Wheel speed sensors $WS_1$, $WS_2$, $WS_3$, and $WS_4$ output pulse signals to the electronic control unit 20 in accordance with the angular velocity of each of the left and right front wheels FL and FR and the left and right rear wheels RL and RR.

The antiskid control apparatus further comprises a vehicle acceleration sensor GS for detecting the acceleration of the vehicle in its lengthwise direction.

A brake switch BS is turned on when the driver presses the brake pedal 11, thus outputting, to the electronic control unit 20, a signal indicating that the brake pedal 11 has been pressed.

Figure 2:
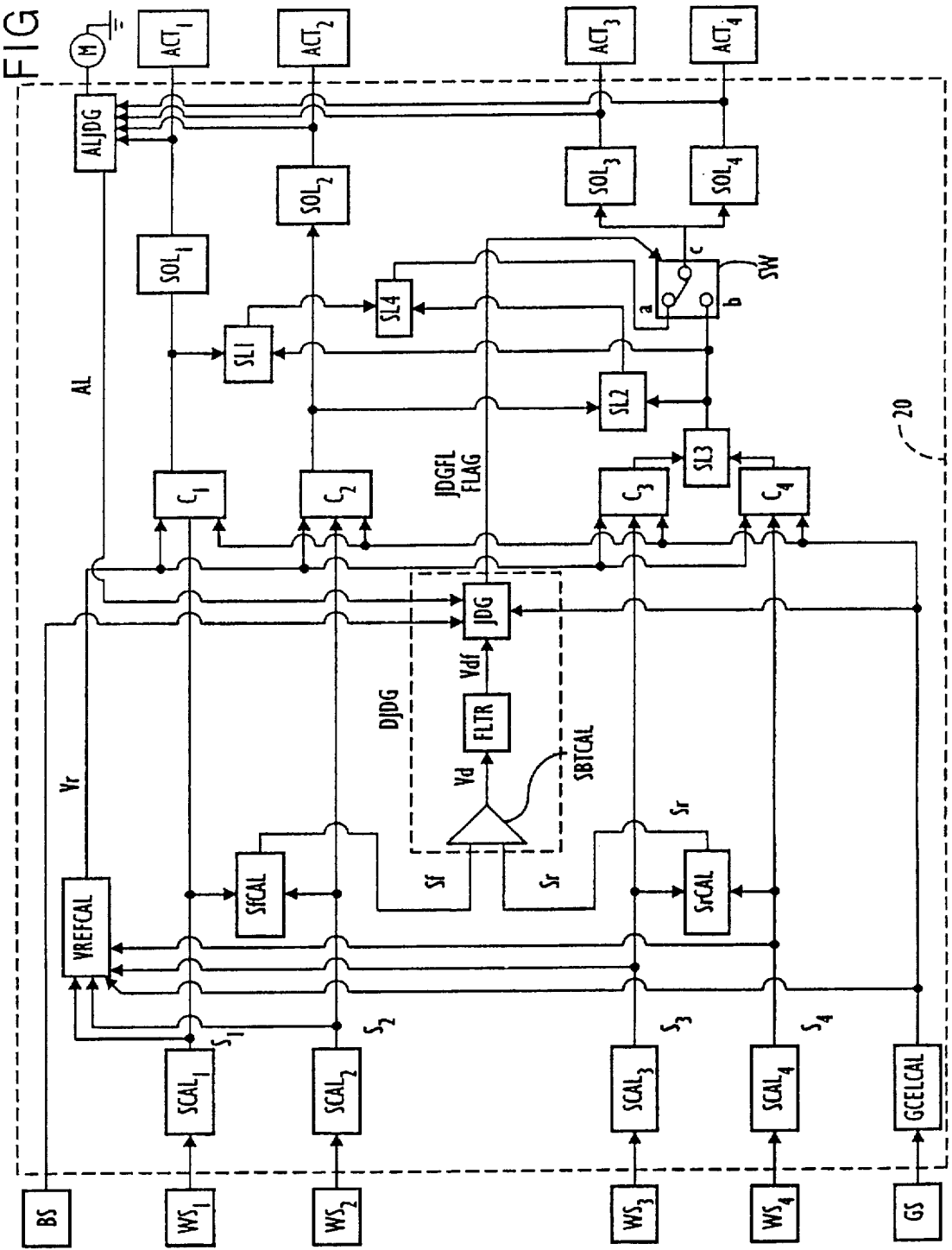
FIG. 2 is a schematic view showing an electronic control unit according to the first embodiment of the present invention.

As shown in FIG. 2, the electronic control unit 20 comprises wheel speed calculation means $SCAL_1$, $SCAL_2$, $SCAL_3$, and $SCAL_4$; a vehicle deceleration calculation means GCELCAL; an estimated vehicle speed calculation means VREFCAL; an average front wheel-speed calculation means SfCAL, an average rear wheel-speed calculation means SrCAL; a drive state decision means DJDG; antiskid control decision means $C_1$, $C_2$, $C_3$, and $C_4$; a first select-low means SL1, a second select-low means SL2, a third select-low means SL3, and a fourth select-low means SL4; drive signal output means $SOL_1$, $SOL_2$, $SOL_3$, and $SOL_4$; a control change-over means SW; and a control state decision means ALJDG.

Based on pulse signals outputted from the wheel speed sensors $WS_1$, $WS_2$, $WS_3$, and $WS_4$, the wheel speed calculation means $SCAL_1$, $SCAL_2$, $SCAL_3$, and $SCAL_4$ calculate the wheel speeds $S_1$ and $S_2$ of each of the left and right front wheels FL and FR and the wheel speeds $S_3$ and $S_4$ of each of the left and right rear wheels RL and RR, thus outputting the calculated wheel speeds $S_1$ through $S_4$ to the estimated vehicle speed calculation means VREFCAL and the antiskid control decision means $C_1$, $C_2$, $C_3$, and $C_4$, respectively.

Further, the wheel speed calculation means $SCAL_1$ and $SCAL_2$ output the wheel speeds $S_1$ and $S_2$ of each of the left and right front wheels FL and FR to the average front wheel-speed calculation means SfCAL. Similarly, the wheel speed calculation means $SCAL_3$ and $SCAL_4$ output the wheel speeds $S_3$ and $S_4$ of each of the left and right rear wheels RL and RR to the average rear wheel-speed calculation means SrCAL.

Based on an output of the vehicle acceleration sensor GS, the vehicle deceleration calculation means GCELCAL calculates the deceleration GCEL of the vehicle, thus outputting the deceleration GCEL to the estimated vehicle speed calculation means VREFCAL, the drive state decision means DJDG, and the antiskid control decision means $C_1$, $C_2$, $C_3$, and $C_4$.

As shown in the following equation (1), the average front wheel-speed calculation means SfCAL calculates the average front wheel speed Sf based on the wheel speed $S_1$ of the left front wheel FL and the wheel speed $S_2$ of the right front wheel FR, thus outputting the average front wheel speed Sf to the drive state decision means DJDG.

$$Sf=(S_1+S_2)/2 \ldots \quad (1)$$

As shown in the following equation (2), the average rear wheel-speed calculation means SfCAL calculates the average rear wheel speed Sr based on the wheel speed $S_3$ of the left rear wheel RL and the wheel speed $S_4$ of the right rear wheel RR, thus outputting the average speed Sr to the drive state decision means DJDG.

$$Sr=(S_3+S_4)/2 \ldots \quad (2)$$

Based on the wheel speeds $S_1$ through $S_4$, the estimated vehicle speed calculation means VREFCAL calculates an estimated vehicle speed Vr which is an estimated value of the vehicle speed by using a known method, thus outputting the estimated vehicle speed Vr to the antiskid control decision means $C_1$, $C_2$, $C_3$, and $C_4$.

The drive state decision means DJDG according to the first embodiment comprises a speed difference calculation means SBTCAL for calculating the speed difference between the average front wheel speed and the average rear wheel speed; a filter means FLTR; and a decision means JDG.

Upon receipt of the average front wheel speed Sf and the average rear wheel speed Sr, the speed difference calculation means SBTCAL calculates a speed difference Vd between the average front wheel speed Sf and the average rear wheel speed Sr, as shown in the following equation (3), thus outputting the speed difference Vd to the filter means FLTR.

$$Vd=Sf-Sr \ldots \quad (3)$$

The filter means FLTR calculates a smoothed speed difference Vdf by performing filter processing on the speed difference Vd, thus outputting the smoothed speed difference Vdf to the decision means JDG. In the first embodiment, a low-pass filter processing is performed on the speed difference Vd so as to calculate the smoothed speed difference Vdf as shown in the following equation (4).

$$Vdf=\underline{Vdf}+(Vd-\underline{Vdf})*k \ldots \quad (4)$$

In the above equation (4), the smoothed speed difference Vdf on the left indicates a smoothed speed difference in the current control cycle, and the underlined smoothed speed difference Vdf on the right indicates a smoothed speed difference in the previous control cycle. A symbol k of the equation (4) is a filter constant set in a range of $0<k<1$.

The decision means JDG sets the value of a flag FLAG indicating the drive state to "0" corresponding to the 4WD, if the smoothed speed difference Vdf is in a range between an upper threshold $Vth_1$ and a lower threshold $Vth_2$, whereas the decision means JDG sets the value of the flag FLAG to "1" corresponding to the 2WD, if the smoothed speed difference Vdf is out of the above range. The value of the flag FLAG is outputted to the control change-over means SW.

Upon receipt of a signal outputted from the brake switch BS, the decision means JDG detects the start of a braking operation. The absolute value of the upper threshold $Vth_1$ and that of the lower threshold $Vth_2$ are set to a great value, respectively for a predetermined period of time after the braking operation starts. Upon receipt of a signal AL indicating that the antiskid control operation is currently performed from the control state decision means ALJDG and a signal indicating the vehicle deceleration GCEL from the vehicle deceleration calculation means GCELCAL, the decision means JDG sets a drive state decision permission flag JDGFL to "1" if the decision means JDG is in receipt of the signal AL and the vehicle deceleration GCEL is less than a predetermined value, whereas the decision means JDG sets the drive state decision permission flag JDGFL to "0", if the decision means JDG is not in receipt of the signal AL or if the vehicle deceleration GCEL is more than the predetermined value. The value of the drive state decision permission flag JDGFL and the value of the flag FLAG are outputted to the control change-over means SW. Upon receipt of a signal indicating the vehicle deceleration GCEL outputted from the vehicle deceleration calculation means GCELCAL, the decision means JDG makes a decision on the drive state only when the body deceleration GCEL is less than the predetermined Value.

Each of the antiskid control decision means $C_1$, $C_2$, $C_3$, and $C_4$ compares with each other the estimated vehicle speed Vr and each of the wheel speeds $S_1$ through $S_4$ of the front and rear wheels FL, FR, RL, and RR to detect the skid condition of each of the wheels FL, FR, RR, and RL. If any one of the antiskid control decision means $C_1$, $C_2$, $C_3$ and $C_4$ has decided that the corresponding wheel has a locking symptom, it outputs a signal requesting the pressure decreasing of the wheel brake 18A, 18B, 18C or 18D corresponding to the wheel having the locking symptom. When the locking symptom is eliminated, the antiskid control decision means $C_1$, $C_2$, $C_3$ or $C_4$ outputs a signal requesting the pressure increasing or the pressure holding of the wheel brake 18A, 18B, 18C or 18D corresponding to the wheel eliminating the locking symptom, while the antiskid control decision means $C_1$, $C_2$, $C_3$ or $C_4$ is comparing the estimated vehicle speed Vr and the corresponding wheel speed $S_1$, $S_2$, $S_3$ or $S_4$ with each other.

In the first embodiment, signals requesting the pressure increasing or the pressure holding of the wheel brakes 18A through 18D are outputted from the antiskid control decision means $C_1$, $C_2$, $C_3$, and $C_4$ so as to switch the control state between the antiskid control in the 2WD and that in the 4WD state. The signals are transmitted to the first select-low means SL1, the select-low means SL2, and the third select-low means SL3.

More specifically, the antiskid control decision means $C_1$ corresponding to the left front wheel FL outputs a signal indicating the decision made thereby on the pressure increasing and pressure decreasing of the wheel brake 18A to the drive signal output means $SOL_1$ and the first select-low means SL1. The antiskid control decision means $C_2$ corresponding to the right front wheel FR outputs a signal indicating the decision made thereby on the pressure increasing and the pressure decreasing of the wheel brake 18B to the drive signal output means $SOL_2$ and the second select-low means SL2.

The antiskid control decision means $C_3$ and $C_4$ corresponding to the left and right rear wheels RL and RR, respectively output a signal indicating the decision made thereby on the pressure increasing and the pressure decreasing of each of the wheel brakes 18C and 18D to the third select-low means $SOL_3$.

The output of the third select-low means SL3 is transmitted to the control change-over means SW and the second select-low means SL2. The output of the first select-low means SL1 and that of the second select-low means SL2 are transmitted to the fourth select-low means SL4. The output of the fourth select-low means SL4 is transmitted to the control change-over means SW.

Upon receipt of signals, the first through fourth select-low means SL1 through SL4 output a signal corresponding to the wheels FL, FR, RL, and RR having a greater locking symptom.

More specifically, upon) receipt of a signal outputted from the antiskid control decision means $C_1$ corresponding to the left front wheel FL and a signal outputted from the third select-low means SL3, the first select-low means SL1 outputs the former signal or the latter indicating a greater locking eymptom to the fourth select-low means SL4.

Upon receipt of a signal outputted from the antiskid control decision means $C_2$ corresponding to the right front wheel FR and a signal outputted from the third select-low means SL3, the second select-low means SL2 outputs the former signal or the latter indicating a greater locking symptom to the fourth select-low means SL4.

Upon receipt of a signal outputted from the antiskid control decision means $C_3$ corresponding to the left rear wheel RL and a signal outputted from the antiskid control decision means $C_4$ corresponding to the right rear wheel RR, the third select-low means SL3 outputs the former signal or the latter indicating a greater locking symptom to the second select-low means SL2 and a second input (b) of the control change-over means SW.

Upon receipt of a signal outputted from the first select-low means SL1 and a signal outputted from the second select-low means SL2, the fourth select-low means SL4 outputs the former signal or the latter indicating a greater locking symptom to a first input (a) of the control change-over means SW.

The control change-over means SW has the first input (a), the second input (b), and an output (c). The first input (a) is connected with the fourth select-low means SL4, while the second input (b) is connected with the third select-low means SL3. The output (c) is connected with the drive signal output means $SOL_3$ and $SOL_4$.

The value of the drive state decision permission flag JDGFL and that of the flag FLAG are transmitted to the control change-over means SW from the drive state decision means DJDG. If the value of the drive state decision permission flag JDGFL is "1" and that of the flag FLAG is "0", the first input (a) and the output (c) are connected with each other, whereas if the value of the drive state decision permission flag JDGFL is "0" or that of the flag FLAG is "1", the second input (b) and the output (c) are connected with each other.

Based on the signal requesting the pressure increasing, the pressure decreasing or pressure holding, each of the drive signal output means $SOL_1$, $SOL_2$, $SOL_3$, and $SOL_4$ outputs a signal to each of the actuators $ACT_1$, $ACT_2$, $ACT_3$, and $ACT_4$ corresponding to each of the wheel brakes 18A, 18B, 18C, and 18D of each of the left front wheel FL, the right front wheel FR, the left rear wheel RL, and the right rear wheel RR.

In the first embodiment, owing to the provision of the first through fourth select-low means SL1 through SL4 and the control change-over means SW, when the value of the drive state decision permission flag JDGFL is "1" and that of the flag FLAG is "0", whether the vehicle is in the 2WD state or the 4WD state is discriminated. During the 4WD state, a signal is directly transmitted from each of the antiskid control decision means $C_1$ and $C_2$ corresponding to each of the left and right front wheels FL and FR to the drive signal output means $SOL_1$ and $SOL_2$, respectively. At this time, signals are outputted from the fourth select-low means SL4 to the drive signal output means $SOL_3$ and $SOL_4$. Of the signals outputted from the antiskid control decision means $C_1$ through $C_4$ corresponding to each of the left and right front wheels FL and FR and the left and right rear wheels RL and RR to the drive signal output means $SOL_3$ and $SOL_4$, only a signal indicating the greatest locking symptom is inputted to the drive signal output means $SOL_3$ and $SOL_4$ via the fourth select-low means SL4.

When the value of the drive state decision permission flag JDGFL is "0" or that of the flag FLAG ms "1", it is not decided whether the vehicle is in the 2WD state or the 4WD state. During the 2WD state, a signal outputted from each of the antiskid control decision means $C_1$ and $C_2$ corresponding to each of the left and right front wheels FL and FR is directly inputted to the drive signal output means $SOL_1$ and $SOL_2$, respectively. At this time, signals are outputted from the third select-low means SL3 to the drive signal output means $SOL_3$ and $SOL_4$. Of the signals outputted from the antiskid control decision means $C_3$ and $C_4$ corresponding to each of the left and right rear wheels RL and RR to the drive signal output means $SOL_3$ and $SOL_4$, only a signal indicating a greater locking symptom is inputted to the drive signal output means $SOL_3$ and $SOL_4$ via the third select-low means SL3.

As apparent from the foregoing description, when the value of the drive state decision permission flag JDGFL is "1" and that of the flag FLAG is "0", it is decided whether the vehicle is in the 2WD state or the 4WD state, and the antiskid control for the 2WD is switched to that for the 4WD and vice versa.

The control state decision means ALJDG decides Whether or not the antiskid control is performed on the left and right front wheels FL and FR and the left and right rear wheels RL and RR, based on the drive signals outputted from the drive signal output means $SOL_1$ through $SOL_4$. If control state decision means ALJDG decides that the antiskid control is performed, it outputs, to the drive state decision means DJDG, the signal AL indicating that the antiskid control is currently performed.

Figure 3:
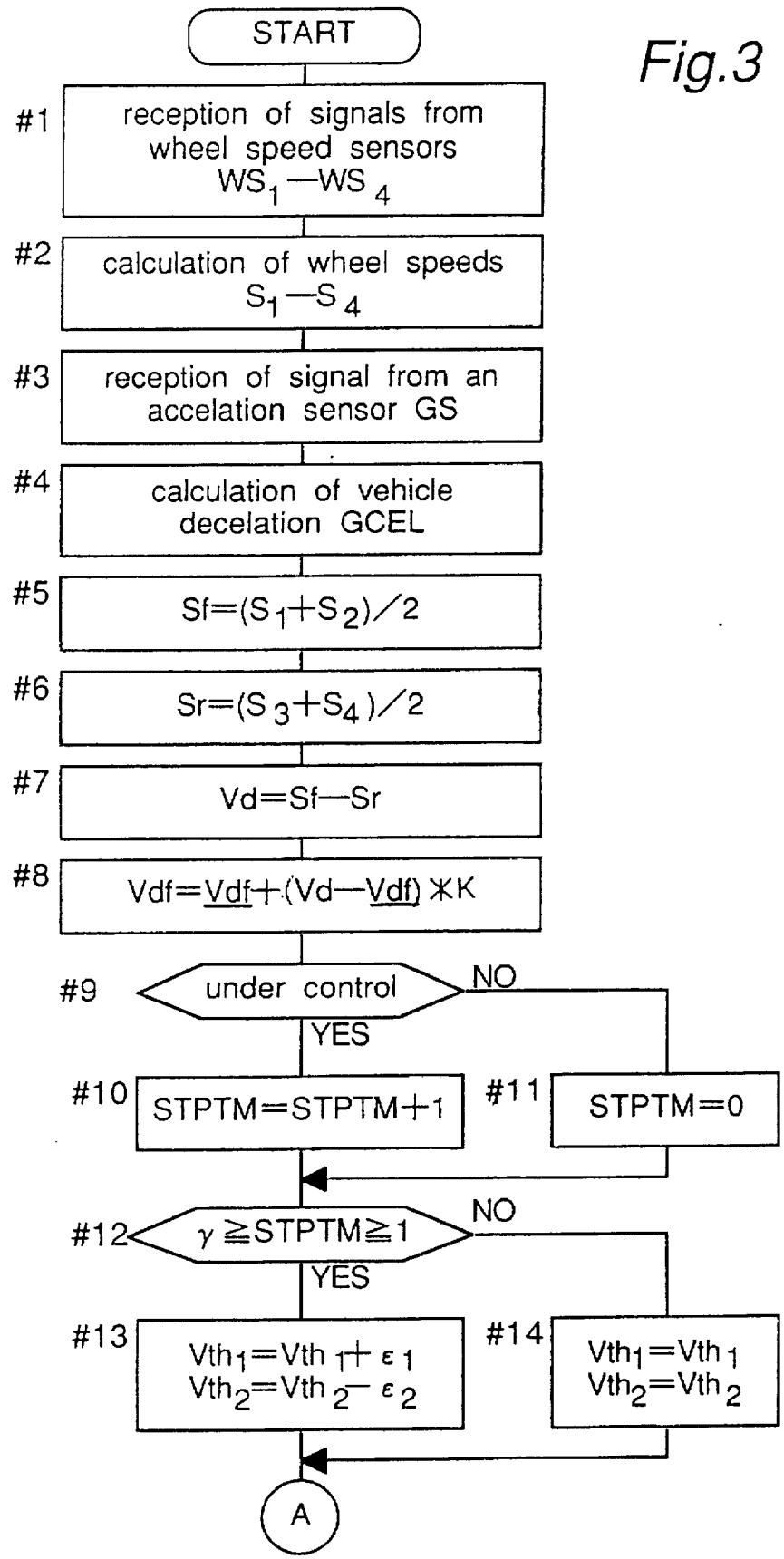
FIG. 3 is a flowchart showing the operation of the first embodiment of the present invention.
Figure 4:
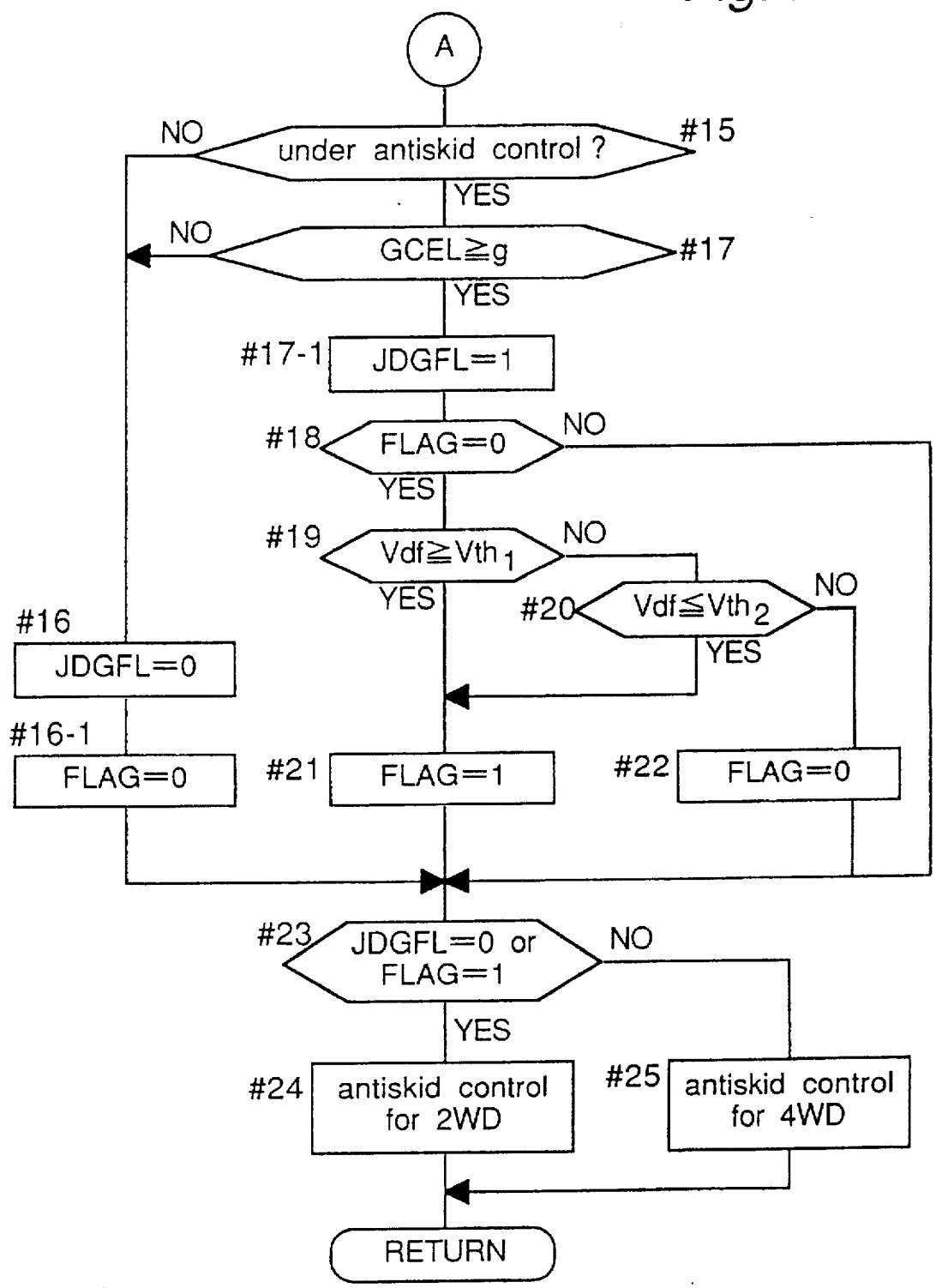
FIG. 4 is a flowchart showing the operation of the first embodiment of the present invention.

The operation of the antiskid control apparatus according to the first embodiment is described below based on the flowcharts shown in FIGS. 3 and 4.

At step #1, the wheel speed calculation means $SCAL_1$ through $SCAL_4$ read pulse signals outputted thereto from each of the wheel speed sensors $WS_1$ through $WS_4$. At step #2, the wheel speed calculation means $SCAL_1$ through $SCAL_4$ calculate the wheel speed $S_1$ of the left front wheel FL, the wheel speed $S_2$ of the right front wheel FR, the wheel speed $S_3$ of the left rear wheel RL, and the wheel speed $S_4$ of the right rear wheel RR, respectively.

At step #3, the vehicle deceleration calculation means GCELCAL reads a signal outputted from the vehicle acceleration sensor GS, thus calculating the vehicle deceleration GCEL at step #4.

At step #5, the average front wheel-speed calculation means SfCAL calculates the average front wheel speed Sf, based on the equation (1). At step #6, the average rear wheel-speed calculation means SrCAL calculates the average rear wheel speed Sr, based on the equation (2).

The drive state decision means DJDG performs processing at steps #7 through #22.

At step #7, the speed difference calculation means SBTCAL calculates the speed difference Vd between the average front wheel speed and the average rear wheel speed, based on the equation (3).

At step #8, the filter means FLTR performs low-pass filter processing on the speed difference Vd, thus calculating the smoothed speed difference Vdf.

At step #9, the decision means JDG decides whether or not a braking operation is currently performed, based on whether or not a signal outputted from the brake switch BS has been inputted thereto. If yes, the program goes to step #10. If no, the program goes to step #11.

At step #10, "1" is added to the value of a braking timer STPTM. At step #11, the value of the braking timer STPTM is cleared to "0".

At step #12, if the value of the braking timer STPTM is: $\gamma \geq STPTM \geq 1$, the decision means JDG decides that a predetermined period of time has not elapsed after the start of the braking operation, thus going to step #13. If no at step #12, the decision means JDG decides that braking operation is not performed or the predetermined period of time has elapsed after the start of the braking operation, thus going to step #14.

At step #13, $\epsilon_1$ is added to the upper threshold $Vth_1$ of the smoothed speed difference Vdf, and $\epsilon_2$ is subtracted from the lower threshold $Vth_2$ thereof. The sign of $\epsilon_1$ and that of $\epsilon_2$ are positive. The sign of $\epsilon_1$ and $\epsilon_2$ are positive at step #14, the value of the upper threshold $Vth_1$ and that of the lower threshold $Vth_2$ remain unchanged.

In the first embodiment, because the absolute value of the upper threshold $Vth_1$ and that of the lower threshold $Vth_2$ are set to a great value, respectively, whether the vehicle is in the 2WD state or the 4WD state can be reliably distinguished, even though the behavior of the vehicle becomes unstable immediately after the braking operation starts.

At step #15, the decision means JDG checks whether or not the signal AL has been inputted thereto from the control state decision means ALJDG. If no, the decision means JDG decides that the antiskid control is not currently performed and the program goes to step #16 without making a decision on whether the vehicle is in the 2WD state or the 4WD state. If yes, at step #15, the decision means JDG decides that the antiskid control is currently performed and the program goes to step #17.

At step #16, the value of the drive state decision permission flag JDGFL is set to "0". Then, the program goes to step #16-1 at which the value of the flag FLAG is set to "0", and then, goes to step #23.

At step #17, upon receipt of a signal indicating the vehicle deceleration GCEL from the vehicle deceleration calculation means GCELCAL, the decision means JDG checks whether or not the vehicle deceleration GCEL is equal to or greater than a predetermined value (g). If the body deceleration GCEL is equal to or greater than the predetermined value (g), the decision means JDG decides that the road does not have a low friction coefficient, thus going to step #16 without making a decision on the drive state. If the vehicle deceleration GCEL is smaller than the predetermined value (g), the program goes to step #17-1 at which the value of the drive state decision permission flag JDGFL is set to "1" and then goes to step #18 at which the decision means JDG checks the flag FLAG. If the value of the flag FLAG is "1", the program goes to step #23, while if the value of the flag FLAG is "0", the program goes to step #19.

At step #19, the JDG compares the smoothed speed difference Vdf and the upper threshold $Vth_1$ with each other. If the former is equal to or greater than the latter, the decision means JDG decides that the difference between the average front wheel speed Sf and the average rear wheel speed Sr is great, thus going to step #21 at which the value of the flag FLAG is set to "1". If the former is smaller than the latter, the program goes to step #20 at which it is checked whether the smoothed speed difference Vdf is equal to or smaller the lower threshold $Vth_2$. If yes, the decision means JDG decides that the difference between the average front wheel speed Sf and the average rear wheel speed Sr is great, thus going to step #21. If no, the program goes to step #22 at which the value of the flag FLAG is set to "0"

At step #23, the decision means JDG checks the value of the drive state decision permission flag JDGFL and that of the flag FLAG. If the value of the drive state decision permission flag JDGFL is "0" or that of the flag FLAG is "1", the program goes to step #24 at which signals outputted from the antiskid control decision means $C_1$ and $C_2$ are directly inputted to each of the drive signal output means $SOL_1$ and $SOL_2$ of each of the front wheels FL and FR. Of signals outputted from the antiskid control decision means $C_3$ and $C_4$, a signal indicating a greater locking symptom is inputted to the drive signal output means $SOL_3$ and $SOL_4$ of each of the left and right rear wheels RL and RR (antiskid control applied to 2WD).

If the value of the drive state decision permission flag JDGFL is "1" and that of the FLAG is "0" the program goes to step #25 at which signals outputted from the antiskid control decision means $C_1$ and $C_2$ are directly inputted to each of the drive signal output means $SOL_1$ and $SOL_2$ of each of the left and right front wheels FL and FR. Of signals transmitted from the antiskid control decision means $C_1$ through $C_4$ corresponding to each of the front and rear wheels FL, FR, RL, and RR, a signal indicating the greatest locking symptom is inputted to the drive signal output means $SOL_3$ and $SOL_4$ of each of the left and right rear wheels RL and RR (antiskid control applied to 4WD).

Figure 5:
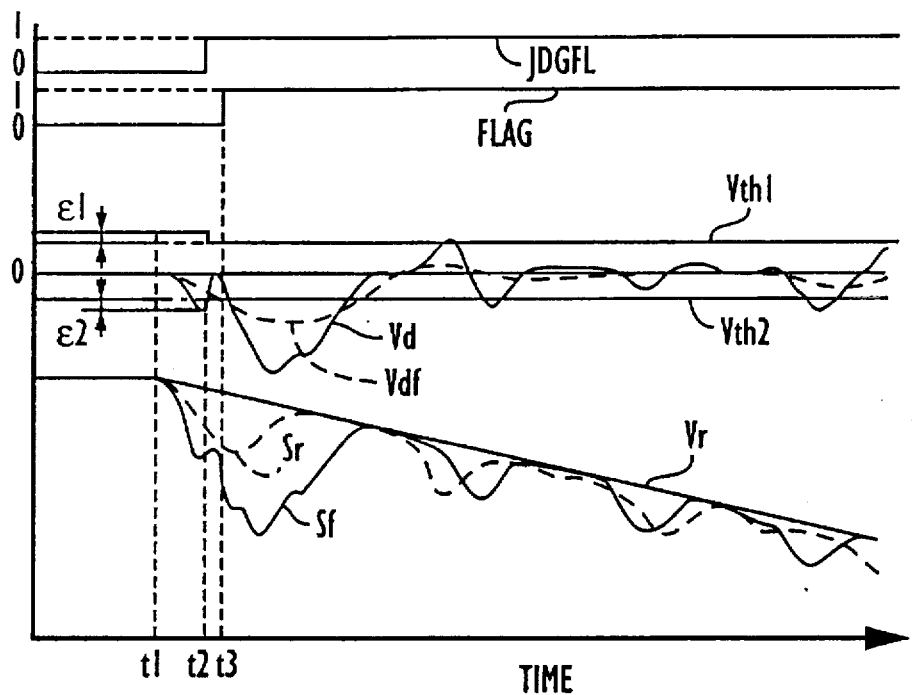
FIG. 5 is a diagram showing an example of a control of the first embodiment of the present invention.

FIG. 5 shows an example of an antiskid control according to the first embodiment. When time is t1, the brake pedal 11 is pressed to start a braking operation. The absolute value of the upper threshold $Vth_1$ and that of the between time t1 and time t2, because the behaviors of the lower threshold $Vth_2$ are set to a great value, respectively wheels become unstable at the start of the braking operation. In this manner, an erroneous detection can be reliably prevented. When the smooth speed difference Vdf exceeds the lower threshold $Vth_2$ at time t3, the drive state is decided as the 2WD and thus the flag FLAG is set to "1". Thereafter, the antiskid control for the 2WD Continues without the antiskid control for the 4WD being performed.

Figure 6:
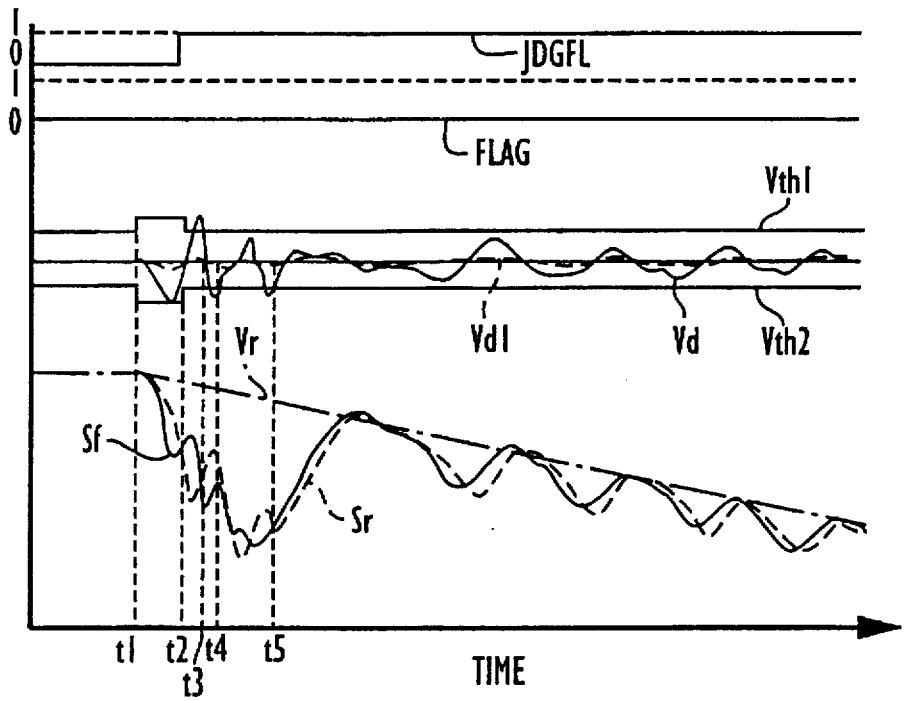
FIG. 6 is a diagram showing another example of the control of the first embodiment of the present invention.

FIG. 6 shows another example of an antiskid control according to the first embodiment. Similarly to the antiskid control shown in FIG. 5, when time is t1, the brake pedal 11 is pressed to start a braking operation, and the absolute value of the upper threshold $Vth_1$ and that of the lower threshold $Vth_2$ are set to a great value, respectively between time t1 and time t2. The antiskid control for the 4WD is performed with the smoothed speed difference Vdf not becoming smaller than the lower threshold or greater than the upper threshold $Vth_1$ and with the value of the flag FLAG kept at "0".

In the period of time between time t2 and time t3 in FIG. 5, the speed difference Vd between the average front wheel speed Sf and the average rear wheel speed Sr is greater than the lower threshold $Vth_2$. At the points t3, t4, and t5 in FIG. 6, the speed difference Vd is smaller than the lower threshold $Vth_2$. At these points, the value of the flag FLAG remains "0". As apparent from the foregoing description, in the first embodiment, the 2WD state and the 4WD are discriminated from each other, based on the smoothed wheel speed difference Vdf obtained of the low-bass filter processing. Thus, even though the speeds of the wheels oscillate, the antiskid control can be accomplished by correctly detecting the drive state.

An antiskid control apparatus according to the second embodiment is described below.

Figure 7:
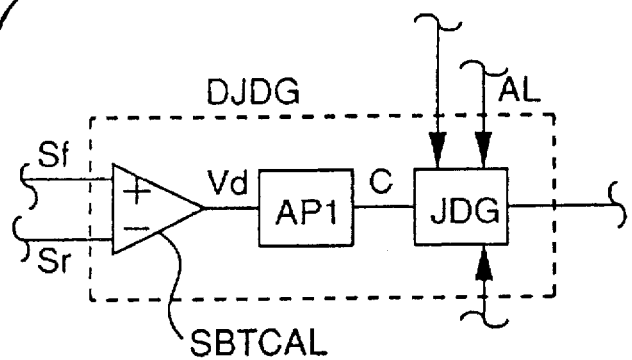
FIG. 7 is a partial schematic view showing an antiskid control apparatus according to a second embodiment of the present invention.

In the second embodiment, the drive state decision means DJDG has a construction as shown in FIG. 7. That is, in addition to the speed difference calculation means SBTCAL and the decision means JDG, the drive state decision means DJDG has an addition means AP1.

As in the case of the second embodiment, the speed difference calculation means SBTCAL calculates the speed difference Vd between the average front wheel speed Sf and the average rear wheel speed Sr, thus outputting the speed difference Vd to the addition means AP1.

The addition means AP1 adds "1" to a calculation value C when the speed difference Vd between the average front wheel speed and the average rear wheel speed is more than an upper limit value $\Delta\alpha$, whereas "1" is subtracted from the calculation value C when the speed difference Vd is less than an lower limit value $-\Delta\alpha$. The calculation value C thus obtained is outputted to the decision means JDG.

The decision means JDG sets the flag FLAG indicating the drive state to "0" corresponding to the 4WD when the calculation value C is in the range between an upper threshold $Cth_1$ and a lower threshold $Cth_2$, while the decision means JDG sets the flag FLAG to "1" corresponding to the 2WD when the calculation value C is out of the above range, thus outputting the values "0" and "1" of the flag FLAG to the control change-over means SW.

Except the provision of the addition means AP1, the construction of the antiskid control apparatus according to the second embodiment is the same as that according to the first embodiment.

Figure 8:
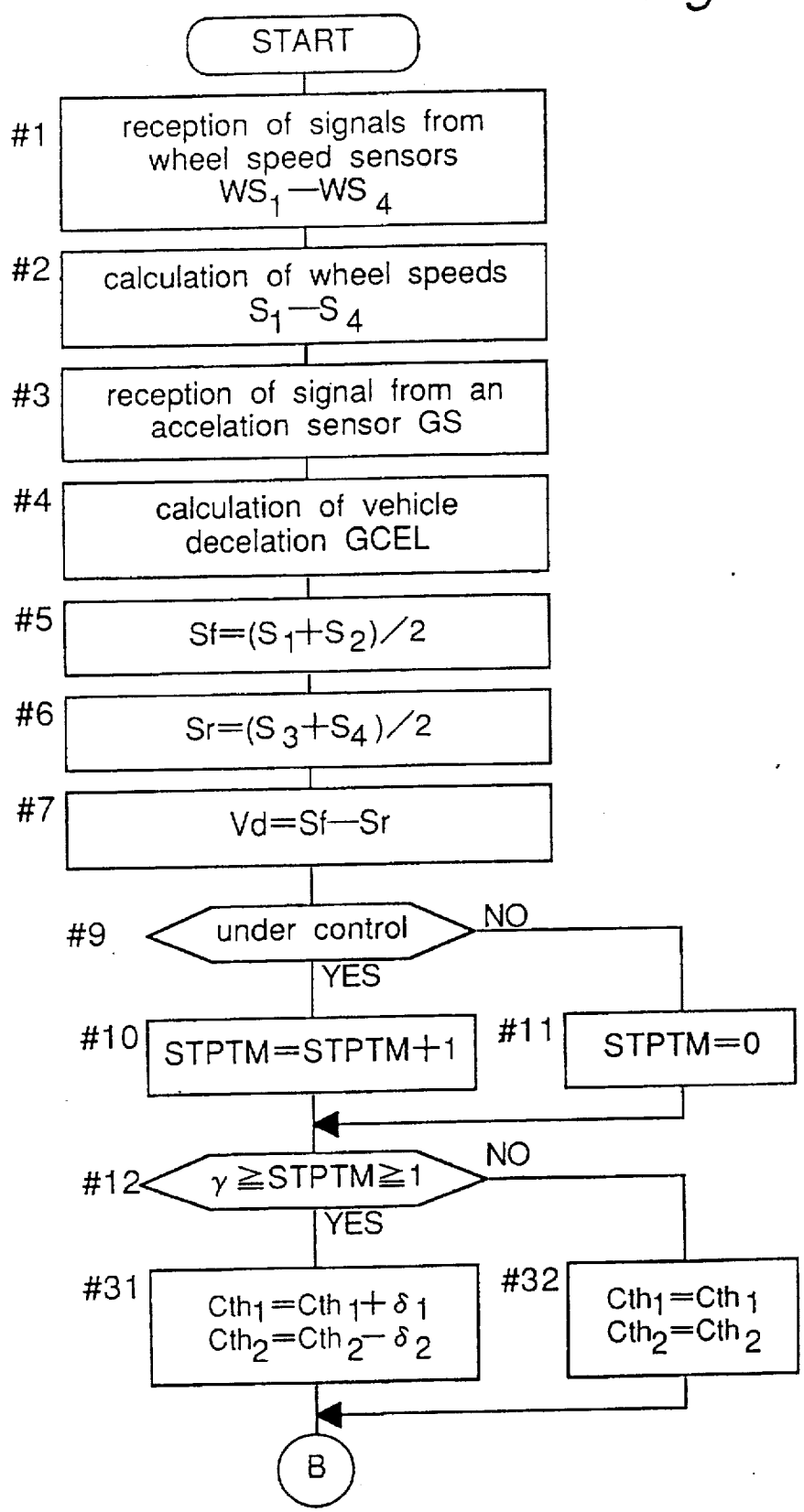
FIG. 8 is a flowchart showing the operation of the second embodiment of the present invention.

The operation of the antiskid control apparatus according to the second embodiment is described below with reference to FIGS. 8 and 9.

The operations to be performed at steps #1 through #7 and steps #9 through #11 in the second embodiment are the same as those to be performed in the first embodiment.

At step #12, if the value of the braking timer STPTM is: $\gamma \geq STPTM \geq 1$, the decision means JDG decides that a predetermined period of time has not elapsed after the start of a braking operation, thus going to step #31 at which $\delta_1$ is added to the upper threshold $Cth_1$, and $\delta_2$ is subtracted from the lower threshold $Cth_2$. The sign of $\delta_1$ and that of $\delta_2$ are positive.

At step #12 if the value of the braking timer STPTM is not in the above range, the decision means JDG decides that the predetermined period of time has elapsed after the start of the braking operation, thus going to step #32 at which the value of the upper threshold $Cth_1$, and that of the lower threshold $Cth_2$ remain unchanged.

At step #33, based on whether the signal AL has been supplied thereto from the control state decision means ALJDG, the decision means JDG decides whether or not the antiskid control is currently performed. If no, i.e., if the antiskid control is not currently performed, the program goes to step #34 without deciding on the drive state. If yes, i.e., if the antiskid control is currently performed, the program goes to step #35.

At step #34, the value of the drive state decision permission flag JDGFL is set to "0" and then, at step #34-1, the calculation value C is cleared to "0". Then, at step #37, the value of the flag FLAG is set to "0". Then, the program goes to step #23.

At step #35, the decision means JDG decides whether or not the vehicle deceleration GCEL is equal to or greater than the predetermined value (g). If the vehicle deceleration GCEL is greater than the predetermined value (g), the decision means JDG decides that the road does not have a low friction coefficient, thus going to step #34 without making a decision on the drive state. If the vehicle deceleration GCEL is smaller than the predetermined value (g), the decision means JDG goes to step #35-1 at which the value of the drive state decision permission flag JDGFL is set to "1", thus going to step #39. At step #39, the decision means JDG checks the flag FLAG. If the value of the flag FLAG is "1", the program goes to step #23, while if the value of the flag FLAG is "0", the program goes to step #40.

At step #40, the speed difference Vd and a dead zone upper limit value $\Delta\alpha$ are compared with each other. If the former is greater than the latter, the program goes to step #41 at which "1" is added to the calculation value C. If the former is smaller than the latter, the program goes to step #42 at which the speed difference Vd and a dead zone lower limit value $-\Delta\alpha$ are compared with each other. If the former is smaller than the latter, the program goes to step #43 at which "1" is subtracted from the calculation value C.

At step #45, the decision means JDG checks the calculation value C is equal to or greater than the upper threshold $Cth_1$. If the former is equal to or greater than the latter, the decision means JDG decides that the 2WD is currently in operation because the state in which the average front wheel speed Vf is greater that the average rear wheel speed Vr has continued for a long time, thus going to step #46 at which the value of the flag FLAG is set to "1". If it is decided at step #45 that the former is smaller than the latter, the program goes to step #47.

At step #47, the decision means JDG checks the calculation value C is equal to or smaller than the lower threshold $Cth_2$. If the former is equal to or smaller than the latter, the decision means JDG decides that the 2WD is currently in operation because the state in which the average rear wheel speed Vr is greater than the average front wheel speed Vf has continued for a long time, thus going to step #46. If it is decided at step #47 that the former is greater than the latter the program goes to step #48 at which the value of the flag FLAG is set to "0".

The operations to be performed at steps #23 through #25 in the second embodiment are the same as those to be performed in the first embodiment.

Figure 10:
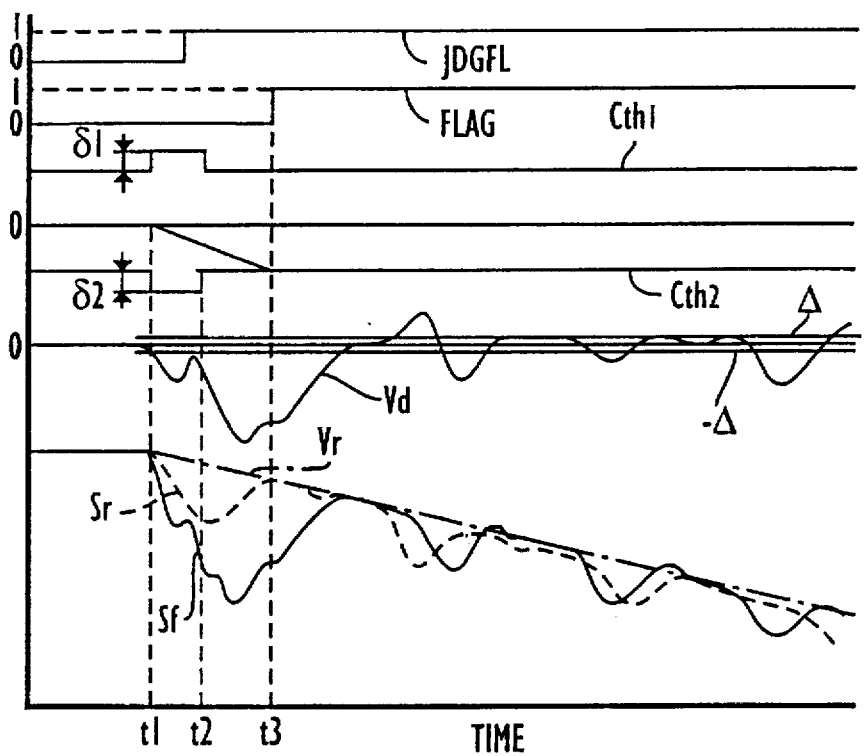
FIG. 10 is a diagram showing an example of a control of the second embodiment of the present invention.

FIG. 10 shows an example of an antiskid control according to the second embodiment. When time is t1, the brake pedal 11 is pressed to start a braking operation. The absolute value of the upper threshold $Cth_1$ of the calculation value C and that of the lower threshold $Cth_2$ thereof are set to a great value, respectively between time t1 and time t2. Thus, only when the period of time in which the difference between the average front wheel speed Vf and the average rear wheel speed Vr is sufficiently large is longer than the predetermined period of time, the decision means JDG decides that the 2WD is in operation currently. In this manner, an erroneous detection can be reliably prevented. When the calculation value C exceeds the lower threshold $Cth_2$ at time t3, the decision means JDG decides that the 2WD is in operation currently, and thus the flag FLAG is set to "1". Thereafter, the antiskid control for the 2WD continues.

Figure 11:
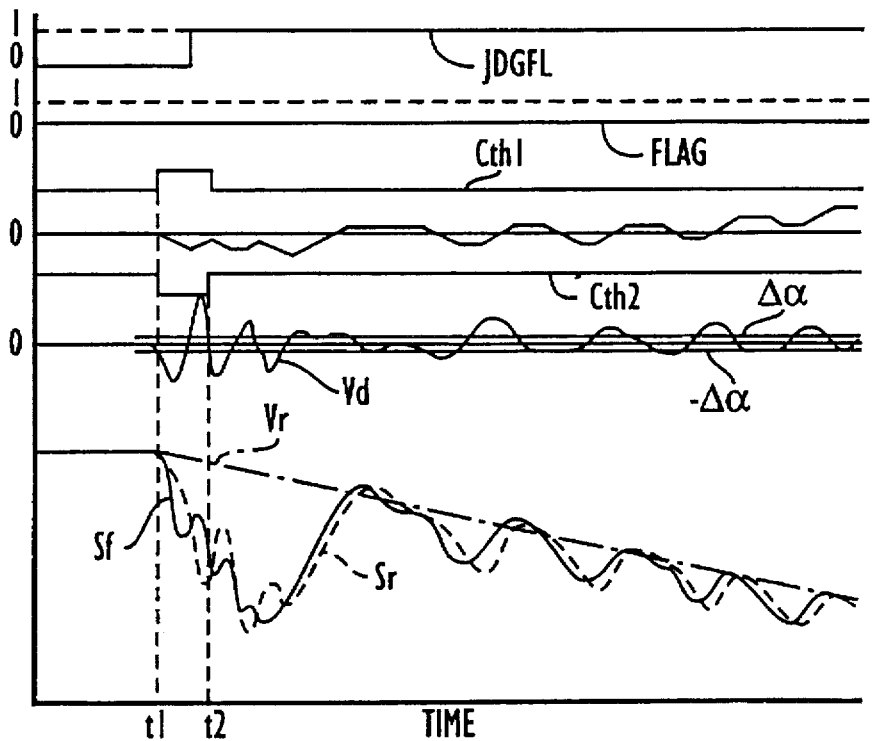
FIG. 11 is a diagram showing another example of the control of the second embodiment of the present invention.

FIG. 11 shows another example of an antiskid control according to the second embodiment. Similarly to the antiskid control shown in FIG. 10, at time t1, the brake pedal 11 is pressed to start a braking operation, and the absolute value of the upper threshold $Cth_1$ of the calculation value C and that of the lower threshold $Cth_2$ thereof are set to a great value, respectively between time t1 and time t2. The antiskid control for the 4WD is performed with the calculation value C not becoming smaller than the lower threshold $Cth_2$ and greater than the upper threshold $Cth_1$ and with the value of the flag FLAG kept at "0".

As described above, in the Second embodiment, if the speed difference Vd is greater than the upper limit value "1" is added to the calculation value, C, whereas if the speed difference Vd is smaller than the lower limit value $-\Delta\alpha$, "1" is subtracted from the calculation value C.

An antiskid control apparatus according to the third embodiment is described below.

Figure 12:
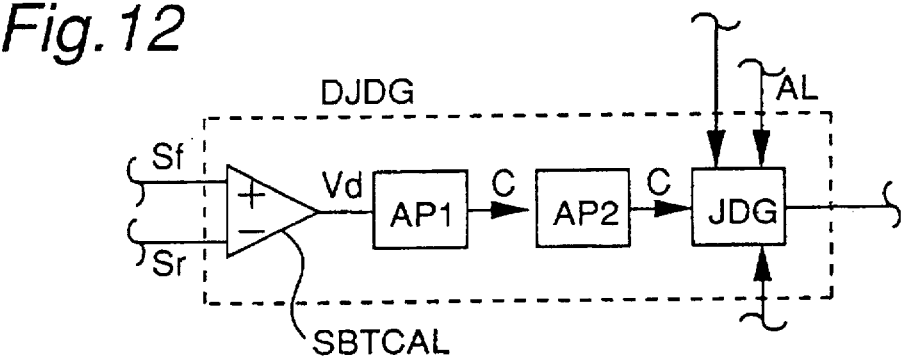
FIG. 12 is a partial schematic view showing an antiskid control apparatus according to a third embodiment of the present invention.

In the third embodiment, the drive state decision means DJDG has a construction as shown in FIG. 12. That is, in addition to the speed difference Calculation means SBTCAL and the decision means JDG, the drive state decision means DJDG has a first addition means AP1 and a second addition means AP2.

For each predetermined number of control cycles (one cycle comprises from steps #1 to #48), the second addition means AP2 subtracts "1" from the calculation value C when the calculation value C is positive, whereas the second addition means AP2 adds "1" to the calculation value C when the calculation value C is negative.

Except the provision of the first addition means AP1 and the second addition means AP2 the construction of the antiskid control apparatus according to the third embodiment is the same as that according to the second embodiment.

Figure 13:
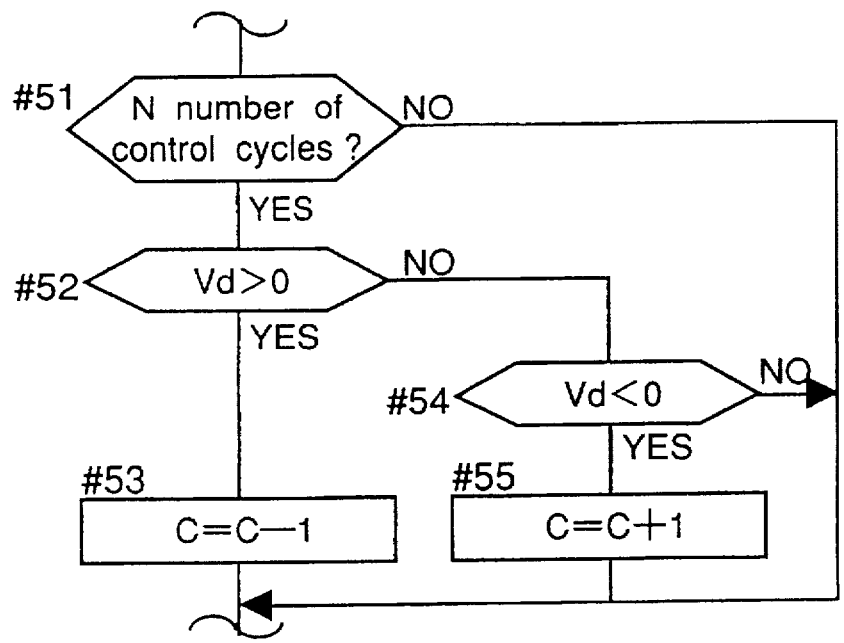
FIG. 13 is a flowchart showing the operation of the third embodiment of the present invention.
Figure 9:
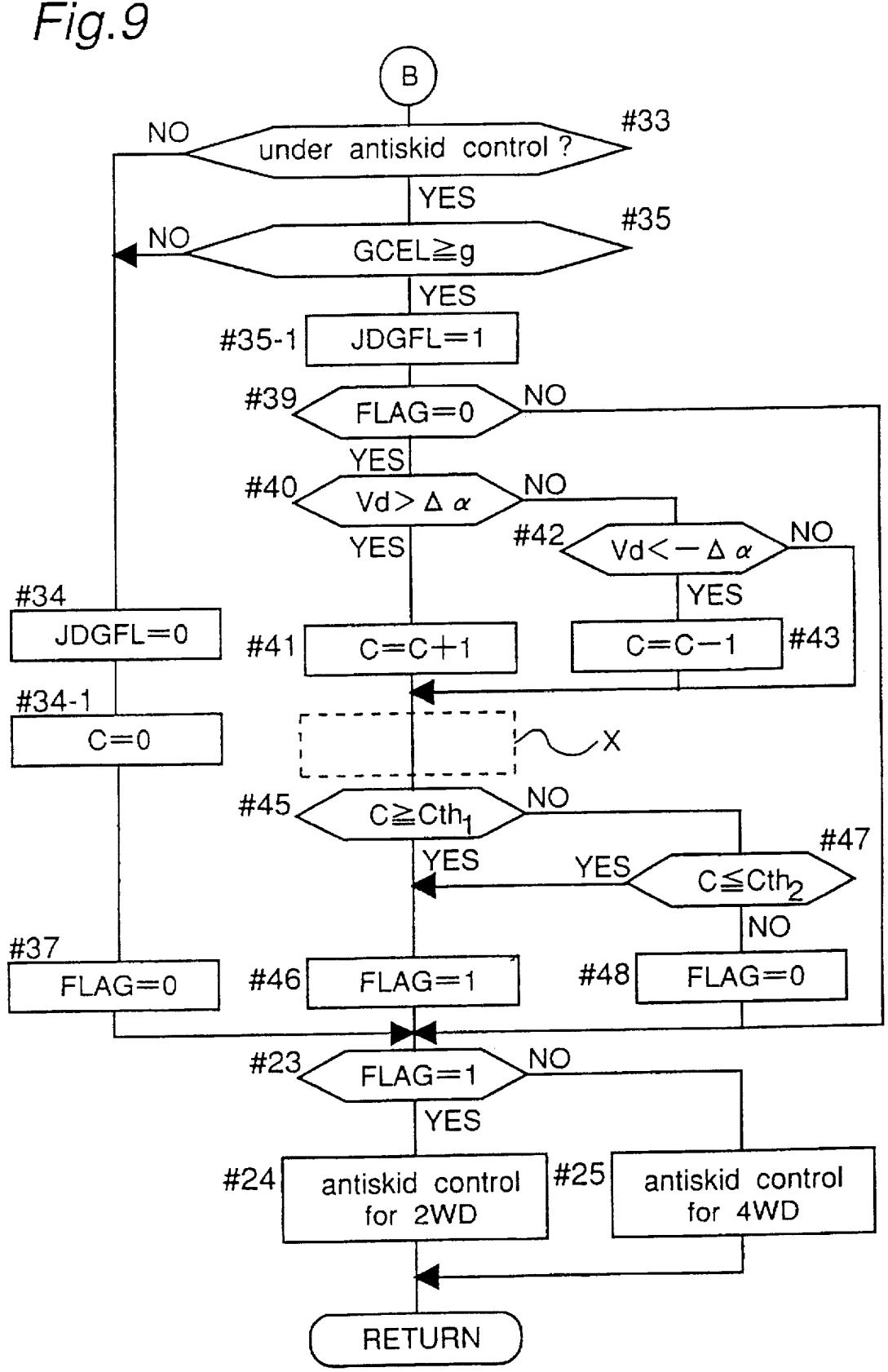
FIG. 9 is a flowchart showing the operation of the second embodiment of the present invention.

The operation of the second embodiment is the same as that of the first embodiment except that processing shown in FIG. 13 is inserted into a portion X, shown in FIG. 9, positioned between step #45 and steps 41, #42, #43.

At step #51 of FIG. 13, the decision means JDG checks whether or not the control is performed for each N ($N \geq 2$) number of control cycles. If yes, the program goes to step #52 at which whether the calculation value C is positive or not is checked. If yes at step #52, the program goes to step #53 at which the second addition means AP2 subtracts "1" from the calculation value C. If no, at step #52, the program goes to step #54 at which whether the calculation value C is negative or not is checked. If yes, the program goes to step #55 at which the second addition means AP2 adds "1" to the calculation value C.

As described above, in the third embodiment, for each several number of control cycles, the second addition means AP2 performs additions when the calculation value C is negative, whereas it performs subtractions when the calculation value C is positive, reversely to the calculation method of the first addition means AP1. Thus, unnecessary additions or subtractions of the calculation value C can be prevented even though the behaviors of the wheels temporarily become unstable, and hence, the drive state of the vehicle can be correctly detected.

The present invention is not limited to the above-described embodiments, but various modifications thereof can be accomplished.

For example, in the case of a vehicle adopting the rear wheel drive as the 2WD, in the drive state decision means DJDG, the absolute value of the upper threshold $Vth_1$ and that of the upper threshold $Cth_1$ may be set to be greater than the absolute value of the lower threshold $Vth_2$ and that of the lower threshold $Cth_2$.

In the case of the vehicle adopting the rear wheel drive as the 2WD, there is a tendency for the speed difference Vd to be located on the upper thresholds $Vth_1$ side and a tendency for the state which generates this tendency to continue for a long time. As a result, there is a possibility that "1" is added to the calculation value C. The 2WD state and the state 4WD can be reliably prevented from being discriminated erroneously from each other by setting the upper thresholds $Vth_1$ and that of $Cth_1$ as described above.

In the case of a vehicle adopting the front wheel drive as the 2WD, in the drive state decision means DJDG, the absolute value of the absolute value of the lower threshold $Vth_2$ and that of the lower threshold $Cth_2$ may be set to be greater than the absolute value of the upper threshold $Vth_1$ and that of upper threshold $Cth_1$.

Reversely to the case of the rear wheel drive, in the case of the vehicle adopting the front wheel drive as the 2WD, there is a tendency for the speed difference Vd to be located on the lower thresholds $Vth_2$ side and a tendency for the state which generates this tendency to continue for a long time. As a result, there is a possibility that "1" is subtracted from the calculation value C. The 2WD state and the 4WD state can be reliably prevented from being discriminated erroneously from each other by setting the upper thresholds $Vth_1$ and that of $Cth_1$ as described above.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An antiskid control apparatus for a vehicle capable of switching a drive state thereof between a 2WD and a 4WD comprising:

means for calculating an average front wheel speed and outputting a signal indicating the calculated average front wheel speed;

means for calculating an average rear wheel speed and outputting a signal indicating the calculated average rear wheel speed;

speed difference calculation means for calculating a speed difference between the average front wheel speed and the average rear wheel speed and outputting a signal indicating the calculated speed difference;

means for smoothing the speed difference and outputting a signal indicating the calculated smoothed speed difference; and drive state decision means for deciding the drive state of the vehicle as a 4WD state if the smoothed speed difference is in a range between a predetermined upper threshold and a predetermined lower threshold and as a 2WD state if the smoothed speed difference is in a range above the predetermined upper threshold or below the predetermined lower threshold, wherein according to the drive state determined by the drive state decision means, the antiskid control state of the vehicle is switched between an antiskid control for the 2WD and an antiskid control for the 4WD, wherein the antiskid control controls the hydraulic brake pressure at each wheel in accordance with the determined drive state.

2. An antiskid control apparatus for a vehicle capable of switching a drive state thereof between a 2WD and a 4WD comprising:

means for calculating an average front wheel speed and outputting a signal indicating the calculated average front wheel speed;

means for calculating an average rear wheel speed and outputting a signal indicating the calculated average rear wheel speed;

speed difference calculation means for calculating a speed difference between the average front wheel speed and the average rear wheel speed and outputting a signal indicating the calculated speed difference;

first addition means for performing an addition of a calculation value when the speed difference between the average front wheel speed and the average rear wheel speed is positive and performing a subtraction of the calculation value when the speed difference is negative; and drive state decision means for deciding the drive state of the vehicle as a 4WD state if the calculation value is in a range between a predetermined upper threshold and a predetermined lower threshold and as a 2WD state if the calculation value is in a range above the predetermined upper threshold or below the predetermined lower threshold, wherein according to the drive state determined by the drive state decision means, the antiskid control state of the vehicle is switched between an antiskid control for the 2WD state and an antiskid control for the 4WD stated wherein the antiskid control controls the hydraulic brake pressure at each wheel in accordance with the determined drive state.

3. An antiskid control apparatus for a vehicle capable of switching a drive state thereof between a 2WD and a 4WD comprising:

means for calculating an average front wheel speed and outputting a signal indicating the calculated average front wheel speed;

means for calculating an average rear wheel speed and outputting a signal indicating the calculated average rear wheel speed;

speed difference calculation means for calculating a speed difference between the average front wheel speed and the average rear wheel speed and outputting a signal indicating the calculated the speed difference;

first addition means for performing an addition of a calculation value when the speed difference between the average front wheel speed and the average rear wheel speed is positive and performing a subtraction of the calculation value when the speed difference is negative;

second addition means for checking the calculation value for each of a predetermined number of control cycles, thus performing a subtraction when the calculation value is positive and performing an addition when the calculation value is negative; and drive state decision means for deciding the drive state of the vehicle as a 4WD state if the calculation value is in a range between a predetermined upper threshold and a predetermined lower threshold and as a 2WD state if the calculation value is in a range above the predetermined upper threshold or below the predetermined lower threshold, wherein according to the drive state determined by the drive state decision means, the antiskid control state of the vehicle is switched between an antiskid control for the 2WD state and an antiskid control for the 4WD state, wherein the antiskid control controls the hydraulic brake pressure at each wheel in accordance with the determined drive state.

4. The antiskid control apparatus according to claim 2, wherein the first addition means performs an addition of the calculation value when the speed difference between the average front wheel speed and the average rear wheel speed is more than an upper limit value a dead zone having a predetermined width including zero and performs a subtraction of the calculation value means when the speed difference is less than a lower limit value of the dead zone.

5. The antiskid control apparatus according to claim 1, wherein when the drive state decision means detects the drive state of the vehicle as the 2WD state, a 2WD antiskid control operation is performed until the 2WD antiskid control operation is completed.

6. The antiskid control apparatus according to claim 1, wherein the drive state decision means sets the absolute value of the upper threshold and of the lower threshold to a first predetermined value and a second predetermined value, respectively, within a predetermined period of time after the start of a braking operation of the vehicle, and the antiskid control apparatus is set to the 2WD state.

7. The antiskid control apparatus according to claim 1, wherein when the vehicle switches to rear wheel drive during the 2WD state, the drive state decision means sets the absolute value of the upper threshold to be greater than that of the lower threshold.

8. The antiskid control apparatus according to claim 1, wherein when the vehicle switches to front wheel drive during the 2WD state, the drive state decision means sets the absolute value of the lower threshold to be greater than that of the upper threshold.

9. The antiskid control apparatus according to claim 1, further comprising a sensor for detecting an acceleration of the vehicle in a lengthwise direction thereof so that the 2WD stake and the 4WD state are discriminated from each other only when the deceleration of the vehicle is less than a predetermined value during the antiskid control, and the antiskid control for the 2WD is performed when the drive state is not discriminated.

* * * * *

UNITED STATES PATENT AND TRADEMARK OFFICE
CERTIFICATE OF CORRECTION

PATENT NO. : 5,594,648
DATED : January 14, 1997
INVENTOR(S) : Tohru NAKAURA

It is certified that error appears in the above-indentified patent and that said Letters Patent is hereby corrected as shown below:

Title page, item [56], "References Cited", "U.S. PATENT DOCUMENTS", line 6, change "Nilde" to ---Niide---.

At column 18, line 57 (claim 9, line 4), change "stake" to ---state---.

Signed and Sealed this

Sixth Day of May, 1997

Attest:

BRUCE LEHMAN

Attesting Officer     Commissioner of Patents and Trademarks